Patented Apr. 18, 1950

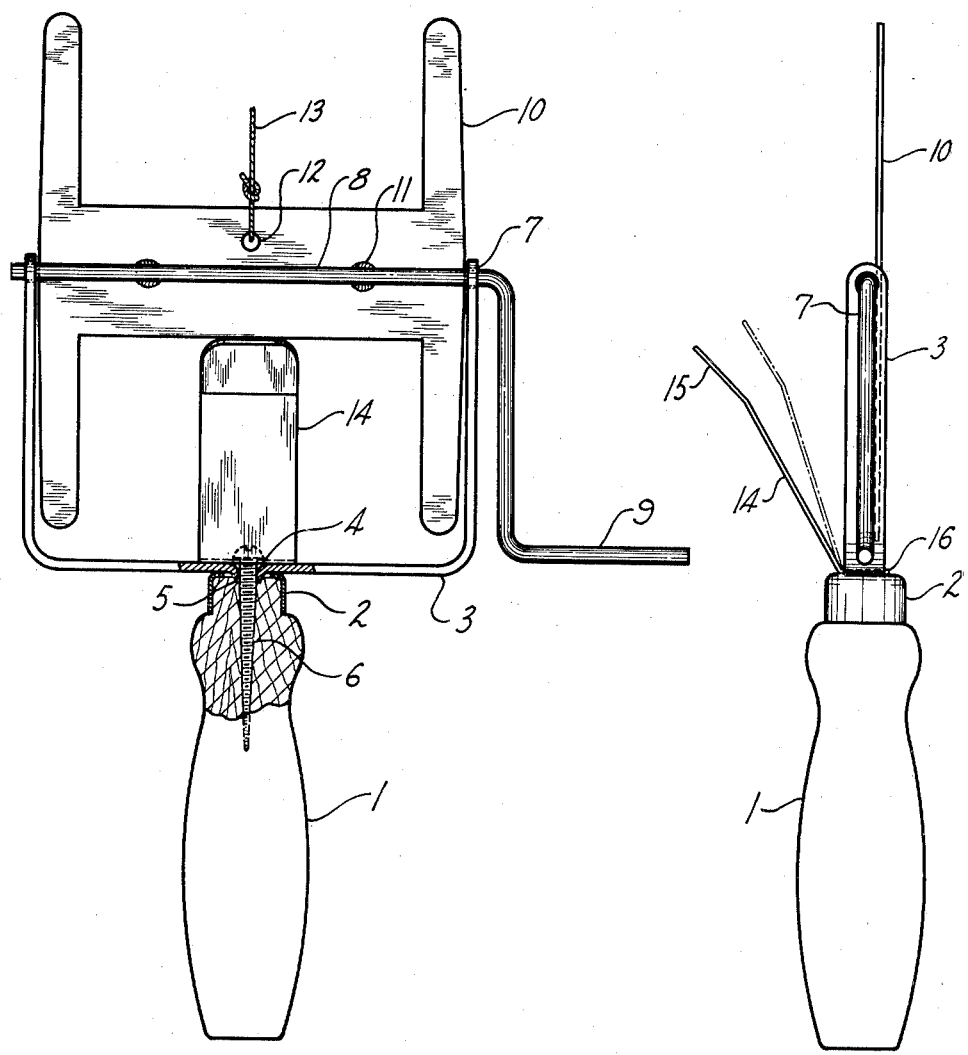

2,504,550

UNITED STATES PATENT OFFICE 2,504,550

HAND LINE REEL

Leo C. Letzkus, Pittsburgh, Pa.

Application September 3, 1948, Serial No. 47,557

1 Claim. (Cl. 242—96)

This invention relates to new and useful improvements in hand reels, more particularly in reels for lines such as fishing lines, kite strings and the like, and it is among the objects thereof to provide a reel of simple construction which shall be adapted to wind a substantial amount of line or kite string by crank motion and to regulate or control the release of same by thumb pressure on a spring brake.

The invention will become more apparent from a consideration of the accompanying drawing, constituting a part hereof, in which like reference characters designate like parts, and in which Fig. 1 is a top plan view, partially in cross section, of a hand reel embodying the principles of this invention, and Fig. 2 a side elevational view thereof.

With reference to the drawing, the numeral 1 designates a handle of wood or the like having a metal ferrule 2 to which is attached a yoke 3 of sheet metal, the yoke having a pierced center 4 with sharp points 5 which are embedded in the end of the handle 1, the yoke being fastened to the handle by a screw 6. The sharp points 5 and screw assure firm support of the yoke on the handle.

The yoke 3 is provided with outlets 7 for receiving a wire rod 8 in the shape of a crank having a handle portion 9. The rod carries a flat sheet metal H-shaped reel 10 which is secured to the rod 7 by spot welding, as shown at 11. The reel 10 has an eyelet 12 for attaching a fishing line or kite string 13. Mounted on the yoke 3 is a thumb spring 14 which is slightly curved as shown at 15 to form a bearing surface for contacting the string that is wound on the reel 10. The spring 14 is engaged by the thumb when handle 1 is gripped, so that the release of the line or string from the reel 10 can be regulated by thumb pressure. The leaf spring 14 is attached to the top of the ferrule 2 by a bent-over portion 16 shown in Fig. 2, which is held down by the screw 6.

The above described hand reel is designed as an inexpensive kite string or fishing reel, and by the use of the thumb tension brake the kite string or fishing line can be controlled to avoid tangling and to keep the line taut on the reel. The spring 14 may be set by bending so as to always contact the line as it is wound on the reel to maintain some pressure without the thumb engaging the spring, and the pressure may be increased when the reel unwinds, as when a kite is flown or a fishing line is under pull when a fish has struck the hook.

Although one embodiment of the invention has been herein illustrated and described, it will be evident to those skilled in the art that various modifications may be made in the details of construction without departing from the principles herein set forth.

I claim:

A reel for hand lines or the like comprising a yoke having a handle extending thereon, a crank mounted in said yoke and a flat H-shaped reel secured to said crank, a tension member for thumbing the line on the reel comprising a flat spring leaf secured to the yoke above the handle portion having a relatively wide contact surface in the center of the reel for engaging the line wound thereon, said tension member terminating short of the axis of the reel and being normally biased outwardly from the yoke and reel member to be out of contact with the reeled line unless depressed by the thumb.

LEO C. LETZKUS.

REFERENCES CITED

The following references are of record in the file of this patent:

UNITED STATES PATENTS

| Number | Name | Date |
|---|---|---|
| 1,227,273 | King | May 22, 1917 |
| 2,203,604 | Stibbins | June 4, 1940 |
| 2,303,645 | Lacy | Dec. 1, 1942 |